E. F. W. ALEXANDERSON.
AUTOMATIC CONTROL OF PHASE CONVERTERS.
APPLICATION FILED APR. 18, 1914.
1,233,952.
Patented July 17, 1917.
2 SHEETS—SHEET 1.
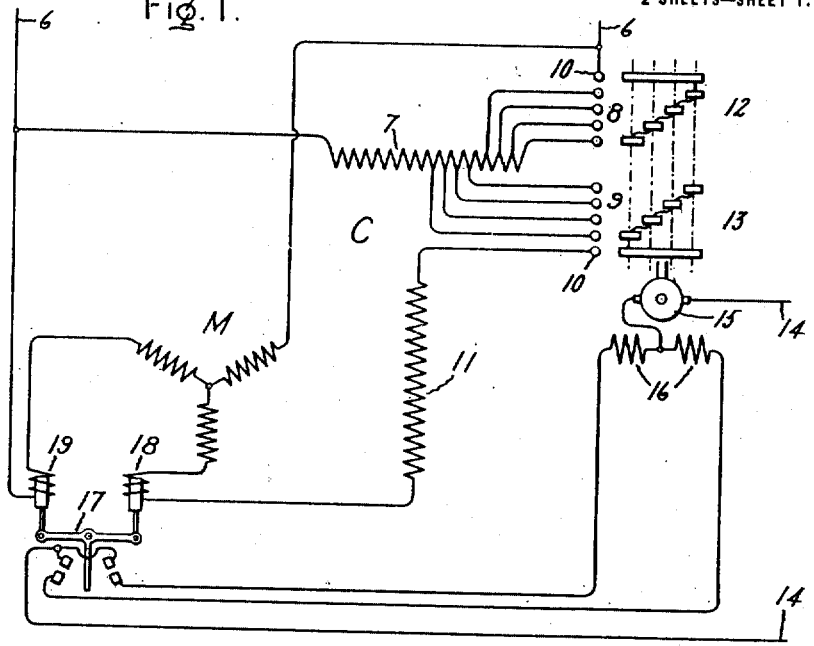
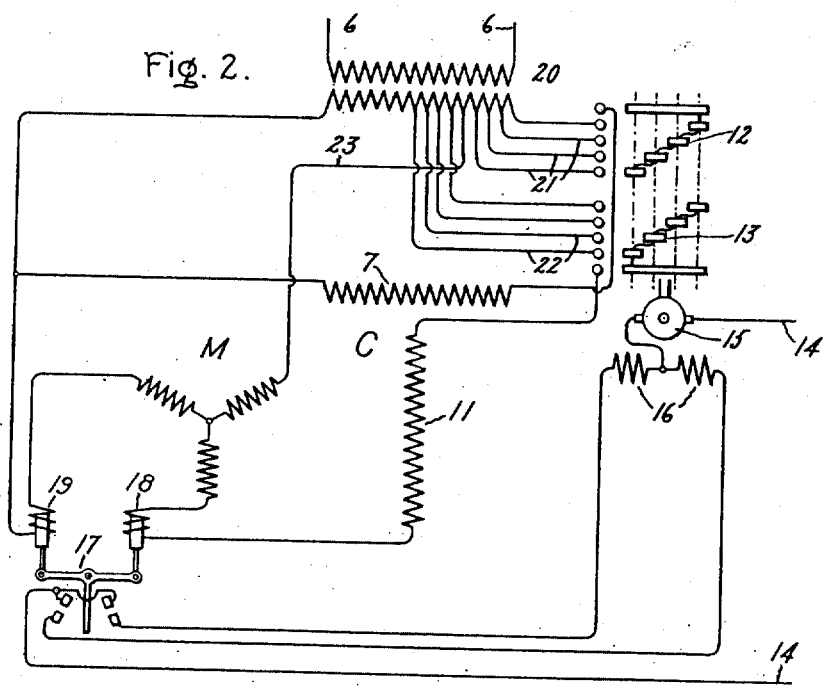
Witnesses:
Anthony Mart
J. Ellis Glen
Inventor:
Ernst F. W. Alexanderson,
by
His Attorney.

E. F. W. ALEXANDERSON.
AUTOMATIC CONTROL OF PHASE CONVERTERS.
APPLICATION FILED APR. 18, 1914.
1,233,952.
Patented July 17, 1917.
2 SHEETS—SHEET 2.
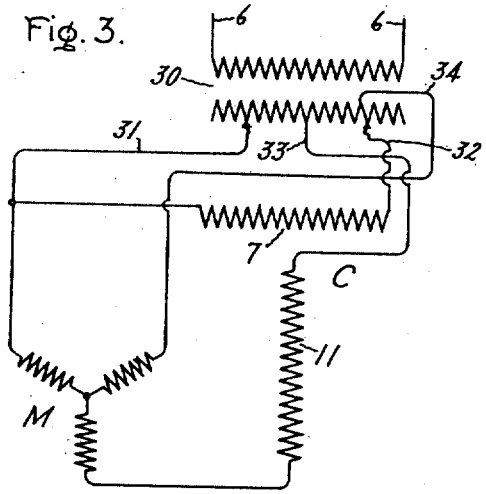
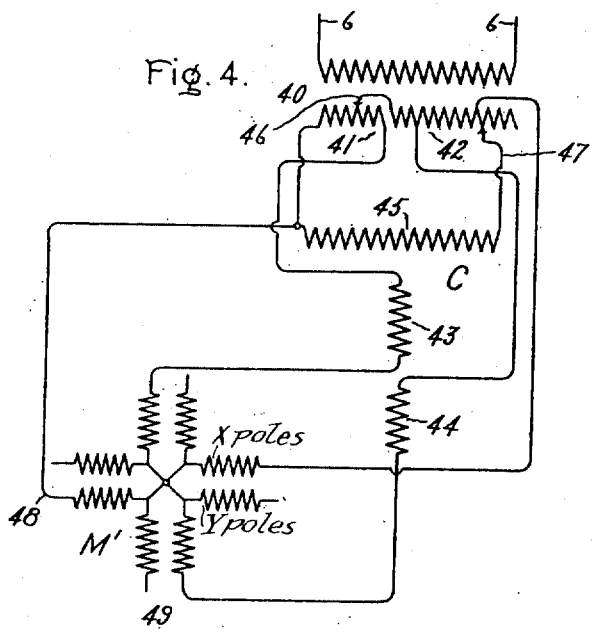
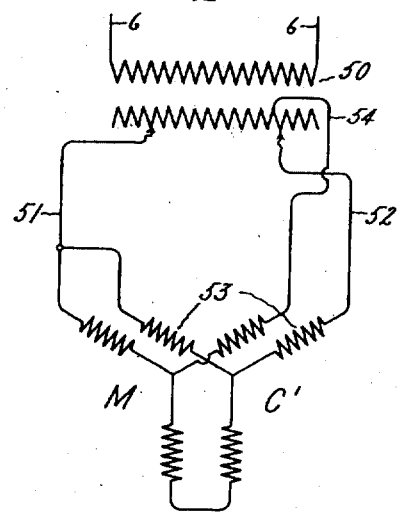
Witnesses:
Anthony Mar
J. Ellis Glen.
Inventor:
Ernst F. W. Alexanderson,
by
His Attorney.

UNITED STATES PATENT OFFICE.

ERNST F. W. ALEXANDERSON, OF SCHENECTADY, NEW YORK, ASSIGNOR TO GENERAL ELECTRIC COMPANY, A CORPORATION OF NEW YORK.

AUTOMATIC CONTROL OF PHASE-CONVERTERS.

1,233,952. Specification of Letters Patent. Patented July 17, 1917.

Application filed April 18, 1914. Serial No. 832,935.

*To all whom it may concern:*

Be it known that I, ERNST F. W. ALEXANDERSON, a citizen of the United States, residing at Schenectady, county of Schenectady, State of New York, have invented certain new and useful Improvements in Automatic Control of Phase-Converters, of which the following is a specification.

My invention relates to the automatic regulation of electro-dynamic phase converters in such a manner as to cause them to deliver balanced voltages under load.

It is well understood that a machine of the polyphase induction motor type having a squirrel cage or phase wound rotor, if it has one phase of the primary connected to a single phase source, will, once it is started, run as a single phase motor, and at no load its speed will be practically synchronous speed. If a polyphase load is connected to the primary windings of the motor, polyphase currents may be taken off. Two systems of electrically connecting such a converter between the single phase source and polyphase load circuit are illustrated in my previous Patents, #901,513 and #1,150,652.

In the former patent is illustrated a parallel arrangement of converter and load circuit in which one converter phase and one phase of the load circuit are each directly connected to the single phase source, and the other converter phases are connected respectively in series with the other load phases. Although, as disclosed in this patent, it is possible to select such a relation and ratio of converter windings and of the voltages impressed upon said windings that balanced voltages may be secured at the motor terminals and hence balanced polyphase currents may be secured in the several phases at a predetermined load, nevertheless if the load departs from said value an unbalancing of the voltages applied to the motor terminals and of the polyphase currents will result.

The Patent #901,513 and my application Serial No. 815,280 filed January 29, 1914, respectively disclose, in connection with the parallel arrangement of connections, the idea of adjusting the connections of the converter windings and of the voltages impressed thereon, in order that at predetermined loads a balance of the voltages applied to the motor terminals and of the polyphase motor currents may be secured.

In the latter patent is illustrated a series arrangement of connections in which one converter phase and one phase of the load circuit are connected, in series with each other, to the single phase source and the other converter phases are connected respectively in series with the other load phases.

The Patent #1,150,652 and my application Serial No. 815,280, filed January 29, 1914, each discloses, in connection with the series arrangement of connections, means whereby a balance of the voltages applied to the motor terminals and of the polyphase currents is automatically and substantially maintained with varying loads.

My present invention has for its object the provision of means in systems of phase conversion of the character above referred to whereby the desired balance between the voltages applied to the load phases and between the polyphase load currents is automatically and substantially maintained for all loads, and to this end I have devised a novel system of control in which suitable circuit changing devices are arranged to be operated automatically under the control of current responsive devices in a plurality of phases of the polyphase system.

My invention will be more readily understood by reference to the accompanying drawings, in which my invention is illustrated as applied to the parallel arrangement of connections, and in which:

Figure 1 shows diagrammatically my invention applied to a two-phase machine of the polyphase motor type acting as phase changer between a single phase supply-circuit and a three-phase motor.

Fig. 2 is a similar view of the equivalent arrangement where the potential of the single-phase supply circuit is such as to require the addition of a transformer as a part of the phase changer.

Figs. 3, 4 and 5 are diagrammatic views showing some possible arrangements of the combined phase converter and transformer to which my invention may be applied.

In the arrangement shown in Fig. 1, power is supplied directly from the mains 6 to a quarter-phase phase converter C of the polyphase motor type and thence to the three-phase motor M. In each case I have illustrated diagrammatically only the primary windings of these machines, which are the parts essential to an understanding of my invention, but it will be understood that each machine is provided with the usual secondary winding and that this may be disposed upon either the rotating or stationary part, as may be desired. Following the customary convention, the phase windings of the quarter-phase phase converter are shown displaced by ninety degrees, while those of the three-phase motor are displaced by 120 degrees. Upon the motor phase 7 of the converter I provide suitable taps which are connected to the fixed contacts 8 and 9 of controllers. One terminal of the line and one terminal of the generator phase 11 are also connected to similar fixed contacts 10. These controllers may be of any suitable construction, and I have shown diagrammatically at 12 and 13 movable contacts as the development of a cylinder. Upon rotation these movable contacts will coöperate with the fixed contacts 8, 9 and 10 to vary the connections of the primary windings 7 and 11 of the phase converter to change the phase relations of the voltages supplied and to vary the volts per turn applied to the motor phase. These changes will operate in the manner previously described to give balanced voltages at any load. With balanced voltages applied to a motor such as that whose primary winding I have shown at M, the currents and hence the heating in each phase will be equal. For the operation of the controller, as by rotation of a cylinder carrying the moving contacts 12, 13, I have provided a motor 15 supplied with current from mains 14. This motor has field windings 16 arranged to cause rotation of the motor in opposite directions. The field terminals are led to a switch 17 designed to connect one or the other to one of the mains 14 according to the direction in which it is desired to rotate the motor. This switch is provided with current-responsive devices, here shown as solenoids 18, 19, in operative relation to two phases of the motor primary M, so that when an unbalancing of the voltages delivered by the converter produces an unbalancing of the currents in the motor the opposing pulls on the arms of the switch 17 will be unequal and move it in one direction or the other. As will be seen, the solenoid 18 is in series with that phase of the motor connected to the generator phase 11 of the converter while the solenoid 19 is in series with one of the phases which is connected directly to the source of supply. This location with respect to the motor phases is, however, not essential, and is only one way in which the desired result may be obtained. With a motor load of the type illustrated the unbalancing with increasing load will usually be in one direction, and the solenoid operated switch with two coils will correctly control the circuit changing devices in the desired manner. Although this series relation of solenoids 18 and 19 to the load seems most desirable for sensitive regulation, since a small change in voltage may produce a considerable change in current, my invention is not limited thereto, but includes any equivalent arrangement of current-responsive devices designed to regulate for balanced voltages.

Where the voltage of the single-phase supply circuit is such as to require the addition of a transformer, then the arrangement shown in Fig. 2 may be used. Here the mains 6 are connected to the primary of the transformer 20, to the secondary of which are connected the motor M and the converter C. When a transformer is used as part of the phase converter, it is found more convenient to arrange the taps, as at 21, 22, upon the secondary of the transformer instead of upon the motor phase of the converter, these taps being connected to the fixed contacts of the controllers 12, 13. As before, the motor receives a fixed voltage by being connected to a tap 23 upon the transformer. Due to the relative positions of the taps 22 and 23, it will be seen that movements of the controller 13 will vary the connections of the phase converter to change the phase relations of the voltages supplied, while movements of the controller 12 will change the volts per turn applied to the motor phase 7 of the converter. The control apparatus used is identical with that in Fig. 1, and exactly similar results are obtained.

So far the arrangements have been such as to maintain a constant voltage on the motor, but it may be desirable to increase the voltage with increasing load in order to increase the magnetizing current supplied thereto. I have accordingly shown diagrammatically in Figs. 3, 4 and 5 some of the possible arrangements of combined phase converter and transformer, and, for the sake of illustration of the possibilities of my scheme, so designed these that the motor voltage is increased with increasing load while balanced voltages are also obtained.

The elements of the apparatus as diagrammatically shown in Fig. 3 are the same as those used in Fig. 2, but I have here shown a slightly different method of control, whereby the impressed voltage on both the motor and the phase changer is increased simultaneously with the increasing load by moving the terminal 31 to the left along the secondary of the transformer 30. One terminal 33 of the generator phase has a fixed position on the transformer as does the terminal 34 of the motor. Evidently, therefore, movement of the terminal 31 to the left will not only increase the voltage applied, but will displace the phase relation of the voltage supplied by phase 11 of the converter and obtain the desired balancing. At the same time, by moving the terminal 32 leading from the motor phase 7 of the phase converter, I further increase the volts per turn impressed on this winding, and thereby increase the flux supplied to the generator phase as previously explained. It will be obvious from an inspection of the drawing that the position of the connections 31 and 32 illustrated is such as to obtain balanced conditions at no load, and that with an increasing load and consequent unbalancing my automatic device would vary these connections to give the desired distortion in order to obtain balanced currents in a polyphase load, and also increase the motor voltage.

In Fig. 4 I have illustrated the combination of a two-phase phase-converter with a two-speed quarter-phase motor provided with a neutral point. It may be desirable in such an arrangement to use a quarter-phase motor provided with two windings having different pole numbers, as, for example, X-poles and Y-poles, and I have, therefore, illustrated such a motor, but it will be obvious that this is not essential to the utilization of my invention. In this scheme, for convenience of control, I have divided the secondary of the transformer 40 into two sections 41 and 42, and have also divided one phase winding of the phase converter into two sections 43 and 44 in order that I may connect them on opposite sides of one phase 49 of the motor M'. An inspection of the drawing will show that here, too, as in Fig. 3, the illustration is of that position necessary for obtaining balanced voltages at no load, the motor phase 45 of the phase converter being connected in parallel with one phase 48 of the motor, while the windings 43 and 44 of the generator phase are connected in series with the other phase 49. By means of moving the terminal 46, connecting the two sections of the secondary, I am able to simultaneously increase the voltage applied to the motor, and introduce an interpolated voltage in the series connected windings 43, 49 and 44. The effect of this interpolated voltage has been clearly described in my Patent #1,150,652, and needs no further description here. By movement to the right of the terminal 47 connected to the motor phase 45 of the converter, I am able to increase the volts per turn applied and obtain an increased flux with increasing load.

In Fig. 5 I have illustrated the combination of a three-phase motor M and a three-phase phase-converter C'. With this arrangement, movement to the left of the terminal 51, which is provided as a common terminal of motor and phase changer, results in increasing the voltage applied to both machines to obtain increased magnetizing current in the motor M and increased volts per turn with increased flux in the motor phases 53 of the converter. Movements of the terminal 52, leading from the motor phases of the phase-converter along the secondary of the transformer 50, result in increasing the distortion, necessary to produce balanced currents in the polyphase motor, because of the fixed position of terminal 54 of the motor.

I have accordingly illustrated a few of the many combinations of a phase converter of the type described and a polyphase load, and, for the sake of convenience, have in each case shown the polyphase load as comprising an induction motor. Obviously, my invention is not limited to such a form of load, but can equally well be applied to any load wherein it is desirable to obtain balanced voltages with varying values of the load. Further, as was set forth in the early part of the specification, it will be seen that my device is entirely automatic, and that any unbalancing of the currents in various phases of the load due to unbalancing of the voltages will serve to set in operation my automatic control and produce the changes necessary to give the desired result.

The particular arrangement of a solenoid operated switch controlling a motor driven controller is here described merely for the purposes of illustration, and I conceive that various modifications of this particular arrangement and of the particular combinations of phase converter and polyphase load may be made, and I accordingly do not desire to be limited to the exact arrangement shown, but seek to cover in the appended claims all such modifications and arrangements as fall within the scope and spirit of my invention.

What I claim as new and desire to secure by Letters Patent of the United States, is,—

1. The combination with a single phase source and a polyphase load circuit, of a phase converter of the polyphase motor type electrically connected therebetween, and means, including a plurality of current responsive devices, for automatically maintaining the polyphase currents substantially balanced under all conditions of load.

2. The combination with a single phase source and a polyphase load circuit, of a phase converter of the polyphase motor type electrically connected therebetween, and means, including a plurality of current responsive devices in operative relation to the branches of the polyphase load, for automatically maintaining the polyphase currents substantially balanced under all conditions of load.

3. In combination, a single phase source of supply, a balanced polyphase load, means including a phase converter of the polyphase motor type, adapted to receive energy from the single phase source of supply and deliver energy to the polyphase load, and means, including a plurality of current responsive devices operatively related to the branches of the polyphase load and a controller governed thereby, for automatically varying the effective voltages delivered to the load to maintain balanced currents therein.

4. In combination, a single phase source of supply, a balanced polyphase load, means, including a phase converter of the polyphase motor type, having a plurality of phase windings, adapted to receive energy from the single phase source of supply and deliver energy to the polyphase load, and means, including a plurality of current responsive devices operatively related to the branches of the polyphase load and a controller governed thereby, for automatically varying the volts per turn applied to one phase winding of the phase converter.

5. In combination, a single phase source of supply, a balanced polyphase load, means, including a phase converter of the polyphase motor type, adapted to receive energy from the single phase source of supply and deliver energy to the polyphase load, and means, including a plurality of current responsive devices operatively related to the branches of the polyphase load and a controller governed thereby, for automatically varying the relative values of two of the induced voltages in the phase converter.

In witness whereof, I have hereunto set my hand this 17th day of April, 1914.

ERNST F. W. ALEXANDERSON.

Witnesses:
BENJAMIN B. HULL,
HELEN ORFORD.

Copies of this patent may be obtained for five cents each, by addressing the "Commissioner of Patents, Washington, D. C."